P. E. & P. W. HAMILTON.
AUTOMATIC NUMBERING DEVICE FOR PHOTOPRINTING MACHINES.
APPLICATION FILED MAY 18, 1917.

1,252,075.

Patented Jan. 1, 1918.
2 SHEETS—SHEET 1.

WITNESSES
Jas. K. McCathran
F. T. Chapman

INVENTORS
Philip E. Hamilton
Paul W. Hamilton

BY E. G. Siggers
ATTORNEY

P. E. & P. W. HAMILTON.
AUTOMATIC NUMBERING DEVICE FOR PHOTOPRINTING MACHINES.
APPLICATION FILED MAY 18, 1917.

1,252,075.

Patented Jan. 1, 1918.
2 SHEETS—SHEET 2.

WITNESSES
Jas. K. McCathran
F. T. Chapman.

Philip E. Hamilton, INVENTORS
Paul W. Hamilton,
BY
C. G. Siggers
ATTORNEY

UNITED STATES PATENT OFFICE.

PHILIP E. HAMILTON AND PAUL W. HAMILTON, OF BEAVER FALLS, PENNSYLVANIA.

AUTOMATIC NUMBERING DEVICE FOR PHOTOPRINTING-MACHINES.

1,252,075.  Specification of Letters Patent.  Patented Jan. 1, 1918.

Application filed May 18, 1917. Serial No. 169,513.

*To all whom it may concern:*

Be it known that we, PHILIP E. HAMILTON and PAUL W. HAMILTON, citizens of the United States, residing at Beaver Falls, in the county of Beaver and State of Pennsylvania, have invented a new and useful Automatic Numbering Device for Photoprinting-Machines, of which the following is a specification.

This invention has reference to automatic numbering devices for photo printing machines, and its object is to provide means whereby photo prints may be automatically numbered in accordance with the order number.

It is customary with concerns making large numbers of photo prints to give each order a number differing from other orders, so that the prints may be readily assembled when finished in accordance with the particular order. If such numbering is done by hand it is time consuming and mistakes are liable to occur. This is especially the case with concerns doing photo printing for amateurs or others where there are but a few prints made from each negative, or a single print from each of a few negatives, two or more negatives being included in a single order, and one or more prints being made from each negative of the order. In accordance with the invention the photo printing machine is provided with a numbering device which may be quickly set in accordance with the number on the order, and then all prints of the particular order have the order number produced thereon and there is no difficulty after the prints have been developed and dried to pick out the proper prints to go with a certain order.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1:
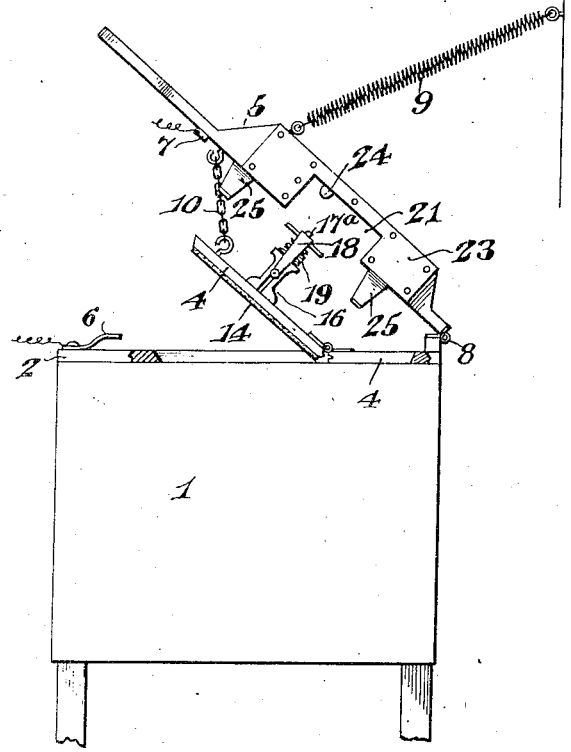
Figure 1 is a side elevation with some parts in section of a printing machine embodying the invention.
Figure 2:
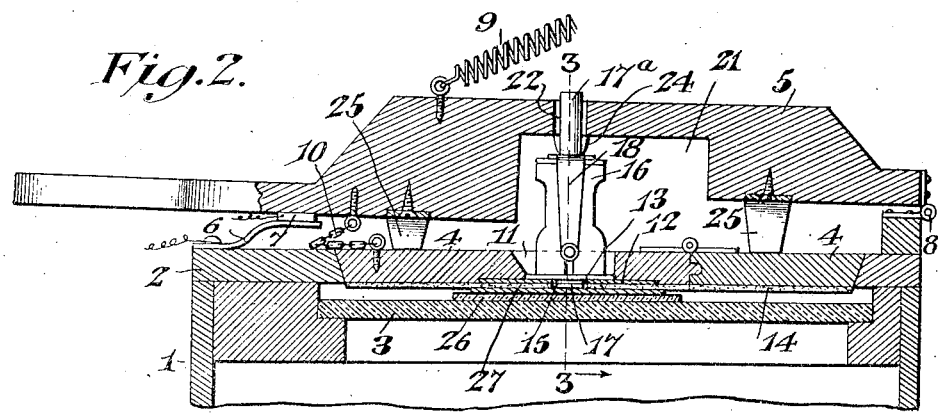
Fig. 2 is a section from front to rear of a portion of the box of the printing machine and the pressure lever showing the numbering attachment applied.
Figure 3:
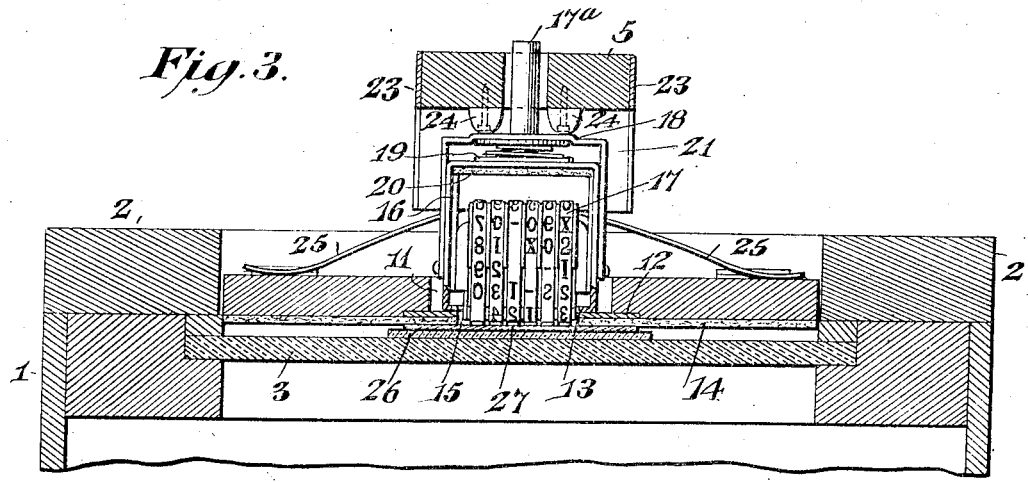
Fig. 3 is a section on the line 3—3 of Fig. 2 with some parts shown in elevation.
Figure 4:
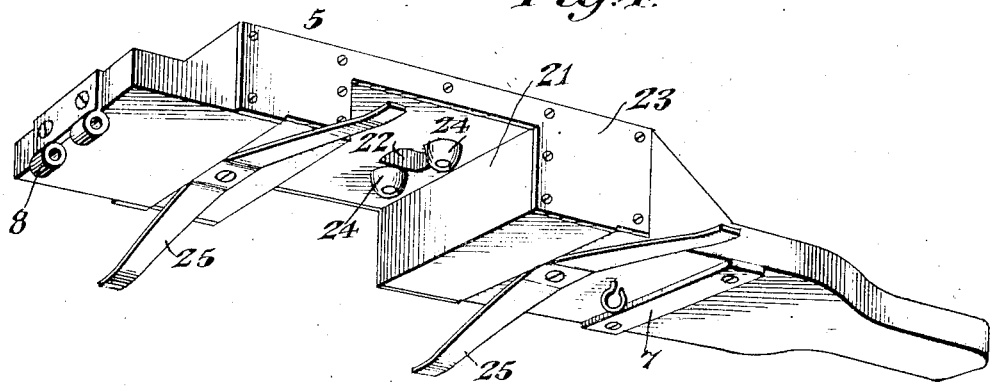
Fig. 4 is a perspective view of the pressure lever as seen from below.

Referring to the drawings there is shown a box 1 having a top 2, glass plate 3, hinged presser board 4 and hinged presser lever 5, all of which are in the main common to photo printing machines designed for the production of large numbers of prints from negatives. It is customary to do the photo printing by electric light, and hence there are provided contacts 6, 7, one on the top 2 and the other on the lever 5 which are brought together when the lever is close to the holding position for the paper on which the prints are made. It is to be assumed that the electric lights are within the box or casing 1, but such devices are not shown as they are common to machines of this character and form no part of the invention. The lever 5 is attached by a hinge or hinges 8 to the box 1, and a spring 9 may be employed to normally hold the lever in an elevated position, while a chain 10 or other flexible means connects the lever and the presser board 4 to lift the latter when the lever is elevated.

The printing machine, indicated in the drawings is to be taken as typical of any suitable printing machine, for the invention is not confined to the particular type of printing machine illustrated, and has nothing to do with the special construction of the printing machine other than the construction necessary to adapt it to the purpose of numbering the prints.

The presser board 4 may be, as is customary, made in two sections hinged together, and one of these sections has an opening 11 therethrough with a plate 12 set in that face of the presser board which in the operation of the printing machine is toward the sensitive paper. The plate 12 is also provided with an opening 13 therethrough for a purpose to be described, while the presser board 4 is provided with a facing 14 of some soft material, such as felt, which in turn is provided with an opening 15 matching the opening 13.

Mounted on the plate 12 is a numbering device 16 which may be of the self inking type and provided with rubber number bands 17, whereby by a proper adjustment of the number bands any desired digits may be assembled into a row representing some chosen number. Numbering devices such as the device 16 usually have a stem 17ª, and in the particular instance shown such stem carries a fork 18 which in turn carries the portion of the device provided with the adjustable number bands 17. A spring 19 is interposed between the body of the numbering device and the fork 18 and has a tendency to move the numbering device into engagement with an inking pad 20 with which numbering devices of the character shown in the drawing are provided.

The lever 5 has a cut away portion or recess 21 to receive the numbering device, and through the lever is a passage 22 to accommodate the stem 17ª. In printing machines of the general type shown in the drawings, the lever 5 is frequently made of wood and in such case the recess 21 causes a diminution in strength of the lever, wherefore cheek plates 23 may be applied to the sides of the lever to stiffen it and avoid liability of breaking the lever. Elastic buttons 24 are carried by the lever within the recess 21 in position to engage the fork 18 and so move the type or number carrying part of the numbering device in opposition to the spring 19.

The lever 5 is provided with the usual yieldable pressure springs 25.

In the operation of the device the glass plate 3, which may be a heavy glass plate, is utilized to support a negative 26 either in the form of a glass negative or a film negative. While the presser board 4 is raised, a sheet 27 of sensitized paper is properly positioned on the negative and the presser board 4 is then lowered into engagement with the sheet of paper, thus holding it against displacement and the presser lever is brought into elastic pressure engaging relation to the presser board, thus holding the sensitized surface of the sensitized paper in intimate contact with the negative. At the same time the presser lever engages the numbering device and the parts are so related that the numbering device is actuated to make an imprint on the back surface of the sensitized paper. The contacts 6 and 7 are brought into engagement during the operation and printing light is produced within the printing box 1, reaching the sensitized paper through the plate 3 and negative 26, thereby light printing the picture represented by the negative upon the paper in the usual manner.

Before prints are made from an order the numbers in the numbering device are properly associated to agree with the number of the order, which latter is usually placed upon the envelop or other container of the negative or negatives. If it be assumed that the order contains several negatives, whether films, plates or both, and that one or more prints are to be made from each negative, then the number on the numbering machine remains the same during all the printing operations necessary to fill the particular order. As soon as the next order is taken up, the number of the numbering machine is correspondingly changed and the sensitized paper is exposed as before, each sheet of paper receiving a number corresponding to the order number, so the machine may be operated until all the orders are filled and the prints are then developed, fixed and finished without further attention. Ultimately it becomes necessary to separate the prints in accordance with the various orders and this is readily accomplished because every print has upon its back a number corresponding to the order to which it belongs, such number being automatically impressed upon the back of the print without other attention on the part of the operator than to change the numbering machine before work upon an order is begun.

The numbering device 16 is so positioned on the plate 12 that the numbers when brought into operative relation to the sensitized paper extend through the openings 13 and 15 to the necessary extent to bear with imprinting force upon the paper lodged on the negative.

The printing machine with the numbering device is capable of rapid operation, since the only attention given to it by the operator is the preliminary setting of the number, the imprints of the numbers upon the paper sheets being entirely automatic and requiring no attention whatever from the operator. Furthermore, there is no liability of mistaken numbering as may occur when each print is separately numbered or otherwise identified by the operator.

While the device 16 has been described as a numbering device, it will be understood that any indicia other than numbers may be employed.

What is claimed is:—

1. In a photo printing machine, movable means for holding photo sensitive paper in contact with negatives while being light printed, other movable means for engaging the first-named movable means to clamp the latter against the located photo sensitive paper, and a numbering device carried by the first-named movable means into and out of operative relation to the paper during the printing operation and located in the path of the second-named movable means for actuation thereby to produce imprints upon the paper on the face thereof remote from the photo sensitive face by the movement of the second-named movable means into clamping position with relation to the first-named movable means.

2. A photo printing machine provided with holding means for photo sensitve paper upon a negative while being light printed, presser means for the paper holding means, and a numbering device carried by the paper holding means and located in the path of the presser means for actuation by the latter to produce an imprint upon the paper when the presser means is brought into operative relation to the paper holding means.

3. In a photo printing machine, a holding member for clamping photo sensitive paper upon a negative in position to be light printed through the negative, a presser member movable into and out of holding relation to the paper holding means, and a numbering device responsive to the movement of the presser means into and out of holding relation to the paper clamping means for producing imprints upon the face of the photo sensitive paper remote from the sensitive side thereof during the printing operation.

4. In a photo printing machine, a holding member for clamping photo sensitive paper upon a negative in position to be light printed through the negative, presser means for engaging the holding member and causing it to press upon the photo sensitive paper, and a changeable numbering device movable into imprinting relation to the photo sensitive paper each time the presser means is moved into pressing relation to the paper holding means, said numbering device having manually changeable numbers to permit adjustment thereof to agree with the numbers of orders for photographic prints.

5. In a photo printing machine, a support for a negative and sensitive paper thereon in position to be light printed, holding means for the paper and negative, a movable clamping member for forcing the holding means into intimate contact with the paper, and the latter with the negative during the light printing of the paper, and a numbering device carried by the holding means and in the path of the clamping means for actuation by the latter to imprint upon the sensitized paper while held in light printing position.

6. A photo printing machine, comprising a support for a negative and sensitized paper thereon, a presser board movable into and out of operative relation to the paper when on the negative, a presser lever movable into holding relation to the presser board, and a numbering device carried by the presser board and movable therethrough to imprint upon paper against which the presser board is forced, said numbering device being in the path of the presser lever for actuation to imprint upon the paper.

7. In combination with a photographic frame of the class described having a removable closure plate, of adjustable means associated with said plate and adapted to automatically stamp the reverse side of a print when the closure plate is in closed position on the frame.

8. In combination with a photographic printing frame of the class described having a removable closure plate, said plate having an opening therethrough, of type carried by the back of said plate and projecting through said opening.

In testimony that we claim the foregoing as our own, we have hereto affixed our signatures in the presence of two witnesses.

PHILIP E. HAMILTON.
PAUL W. HAMILTON.

Witnesses:
A. D. CAMPBELL,
EARL R. LEYDA.